(12) United States Patent
Perzan et al.

(10) Patent No.: US 11,748,367 B2
(45) Date of Patent: *Sep. 5, 2023

(54) ENTITY SELECTION TOOL SYSTEM AND METHOD

(71) Applicant: Hartford Fire Insurance Company, Hartford, CT (US)

(72) Inventors: Jayne-Marie Perzan, Plainville, CT (US); Adam Denninger, Hartford, CT (US); Ernie Zimmermann, Hartford, CT (US); David J Turner, Farmington, CT (US); Keri M. Tardif, West Hartford, CT (US); Mark J Peryga, Higganum, CT (US); Pavan Kumar Visram, Milford, CT (US); Jaishankar Thiruvengada, Ellington, CT (US); Nelson R. Ward, Jr., New Britain, CT (US); Ramesh V. Yalamanchi, Higgarum, CT (US)

(73) Assignee: HARTFORD FIRE INSURANCE COMPANY, Hartford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/951,923

(22) Filed: Sep. 23, 2022

(65) Prior Publication Data

US 2023/0019179 A1   Jan. 19, 2023

Related U.S. Application Data

(63) Continuation of application No. 16/908,048, filed on Jun. 22, 2020, now Pat. No. 11,487,775.

(51) Int. Cl.
*G06F 16/25* (2019.01)
*G06F 16/245* (2019.01)
(Continued)

(52) U.S. Cl.
CPC ...... *G06F 16/252* (2019.01); *G06F 16/24578* (2019.01); *G06F 16/288* (2019.01)

(58) Field of Classification Search
None
See application file for complete search history.

(56) References Cited

U.S. PATENT DOCUMENTS

2002/0055900 A1\* 5/2002 Kansal ................. G06F 16/13
2006/0235732 A1\* 10/2006 Miller ................. G06F 16/95
(Continued)

*Primary Examiner* — Son T Hoang
(74) *Attorney, Agent, or Firm* — Buckley, Maschoff & Talwalkar LLC

(57) ABSTRACT

A computer server may receive an indication of a selected potential relationship and retrieve, from a use case configuration data store, an electronic record for that relationship. The first entity may then construct computer system configurations in accordance with use case parameters. The computer server may be used to evaluate the constructed computer system configurations, and an entity score result for the first entity may be stored into the use case configuration data store. The computer server may also retrieve, from a quality function deployment data store, an electronic record associated with the first entity and update a uniform scoring matrix by assigning weighted score values for the first entity in connection with a set of platform capabilities. An entity selection tool may be executed to automatically select a recommended entity based on the score results and scoring matrixes, and an indication of the recommended entity may be transmitted.

20 Claims, 15 Drawing Sheets

(51) Int. Cl.
*G06F 16/28* (2019.01)
*G06F 16/2457* (2019.01)

(56) References Cited

U.S. PATENT DOCUMENTS

| | | | |
|---|---|---|---|
| 2018/0240072 A1* | 8/2018 | Dey | G06F 16/252 |
| 2019/0287135 A1* | 9/2019 | Gould | G06F 16/24 |
| 2020/0004938 A1* | 1/2020 | Brannon | G06F 16/28 |
| 2020/0053175 A1* | 2/2020 | Bodman | G06F 16/245 |
| 2020/0133257 A1* | 4/2020 | Celia | G06F 16/24 |

* cited by examiner

AUTOMATED ENTITY SELECTION TOOL

AUTOMATED ENTITY SELECTION TOOL

Entity: VENDOR NEWCO

Date: July 1, 2022

Use Case #1 – Create an Auto Product with Simple Quote Flow

Create a new personal lines auto product for Oregon rating state, to be supported by a simple quote flow. The quote flow will consist of four pages to be accessed by a Customer Service Representative: "General," "Vehicles," "Driver," and "Coverage & Premium." The fields within the quote flow will be built according to enterprise specifications with rules including, but not limited to, the following:

- Cross dependent display
- Field, field name, and field order,
- Data validation,
- Assigned drop-down values
- Cross-field validations
- Backend field derivation Wireframes and User Interface Specifications Each screen in the quote flow will follow the general format displayed in each wireframe, using your platform's out-of-the-box capabilities. Each field element will be created with the rules outlined in the user interface specification document.

Wires and UI Specification.xlsx

SUBMIT

FIG. 6

| Functional Area | Weight | Assigned Score | Calculated Score |
|---|---|---|---|
| Billing | | | |
| Cloud and Platform Network | | | |
| Developer Operations | | | |
| Digital | | | |
| Integration | | | |
| Operations | | | |
| Privacy and Security | | | |
| Product, Data, and Reporting | | | |
| Product, Publishing, and Electronic Data Mgmt | | | |
| Product, Rating, and Modeling | | | |
| Strategic Alignment | | | |
| System Operations and IT Service Mgmt | | | |
| Total: | 100% | | TBD |

FIG. 7

ENTITY SELECTION TOOL SYSTEM AND METHOD

CROSS REFERENCE TO RELATED APPLICATION

This is a continuation of U.S. patent application Ser. No. 16/908,048, entitled "ENTITY SELECTION TOOL SYSTEM AND METHOD," filed Jun. 22, 2020, the entire contents of which are incorporated herein by reference for all purposes.

BACKGROUND

An enterprise might consider entering into a relationship with one or more entities. For example, an enterprise might be interested in finding a vendor or partner to develop one or more Software as a Service ("SaaS") applications. Moreover, the enterprise might evaluate several potential relationships and eventually select the most appropriate entity. For example, the enterprise might select a vendor associated with a configurable cloud computing platform that is able to develop high quality SaaS applications in a relatively fast and cost-efficient way.

Manually evaluating potential relationships, entities, and/or computing platforms, however, can be a time consuming and error prone process. For example, the enterprise might issue a Request For Proposal ("RFP") and then evaluate written submissions provided by various entities in an attempt to find the most appropriate relationship. In some cases, an entity might misunderstand the requirements of the RFP in which case the provided documentation could be inaccurate. Similarly, viewing a generic product demonstration produced an entity could resulting in misunderstandings between the entity and the enterprise (e.g. "How difficult is it to make that type of change on-the-fly?" or "Is that ability available out-of-the-box?"). Selecting the wrong entity to help develop SaaS applications can be a costly mistake for an enterprise and could harm reputations with customers, suppliers, other vendors, employees, etc.

It would be therefore desirable to provide systems and methods for an automated entity selection tool platform that allow faster, more accurate results as compared to traditional approaches.

SUMMARY OF THE INVENTION

According to some embodiments, systems, methods, apparatus, computer program code and means are provided for an automated entity selection tool platform that permits faster, more accurate results as compared to traditional approaches and that allows for flexibility and effectiveness when acting on those results. In some embodiments, a computer server may receive an indication of a selected potential relationship and retrieve, from a use case configuration data store, an electronic record for that relationship. The first entity may then construct computer system configurations in accordance with use case parameters. The computer server may be used to evaluate the constructed computer system configurations, and an entity score result for the first entity may be stored into the use case configuration data store. The computer server may also retrieve, from a quality function deployment data store, an electronic record associated with the first entity and update a uniform scoring matrix by assigning weighted score values for the first entity in connection with a set of platform capabilities. An entity selection tool may be executed to automatically select a recommended entity based on the score results and scoring matrixes, and an indication of the recommended entity may be transmitted.

Some embodiments comprise: means for receiving, at a back-end application computer server, from a remote user device, an indication of a selected potential relationship between an enterprise and a first entity; means for retrieving, from a use case configuration data store, an electronic record associated with the selected potential relationship, including use case parameters, wherein the use case configuration data store contains electronic records that represent a plurality of potential relationships between the enterprise and at least one entity, and each electronic record includes an electronic record identifier, use case parameters, and an entity score result; means for arranging for the first entity to construct a plurality of computer system configurations, on-site at the enterprise, in accordance with the use case parameters; means for evaluating the constructed computer system configurations and storing an entity score result for the first entity into the use case configuration data store; means for retrieving, from a quality function deployment data store, an electronic record associated with the first entity, wherein the quality function deployment data store contains electronic records that represent the plurality of potential relationships, and each electronic record includes an electronic record identifier and a uniform scoring matrix; means for updating the uniform scoring matrix by assigning weighted score values for the first entity in connection with a set of platform capabilities; means for executing an entity selection tool to automatically select a recommended entity based on entity score results and uniform scoring matrixes; and means for transmitting an indication of the recommended entity to an interactive graphical user interface display via a distributed communication network.

In some embodiments, a communication device associated with a back-end application computer server exchanges information with remote devices in connection with an interactive graphical user interface. The information may be exchanged, for example, via public and/or proprietary communication networks.

A technical effect of some embodiments of the invention is an improved and computerized way to provide an automated entity selection tool platform in a way that provides faster, more accurate results as compared to traditional approaches. With these and other advantages and features that will become hereinafter apparent, a more complete understanding of the nature of the invention can be obtained by referring to the following detailed description and to the drawings appended hereto.

BRIEF DESCRIPTION OF THE DRAWINGS

FIG. 6 is a use case display according to some embodiments.

FIG. 7 is a quality function deployment uniform scoring matrix according to some embodiments.

DETAILED DESCRIPTION

The present invention provides significant technical improvements to facilitate electronic messaging and dynamic data processing. The present invention is directed to more than merely a computer implementation of a routine or conventional activity previously known in the industry as it significantly advances the technical efficiency, access, and/or accuracy of communications between devices by implementing a specific new method and system as defined herein. The present invention is a specific advancement in the area of electronic risk analysis and/or resource allocation by providing benefits in data accuracy, data availability, and data integrity and such advances are not merely a longstanding commercial practice. The present invention provides improvement beyond a mere generic computer implementation as it involves the processing and conversion of significant amounts of data in a new beneficial manner as well as the interaction of a variety of specialized client and/or third-party systems, networks, and subsystems. For example, in the present invention information may be processed, updated, and analyzed via a back-end-end application server to accurately compare relationship information (including test result), the performance and/or abilities of a computing platform, the allocation of resources, and/or the exchange of information, thus improving the overall efficiency of the computer system associated with message storage requirements and/or bandwidth considerations of an enterprise (e.g., by reducing the number of messages that need to be transmitted via a communication network). Moreover, embodiments associated with collecting accurate information might further improve risk values, predictions of risk values, allocations of resources, electronic record routing and signal generation, the automatic establishment of communication links (e.g., to facilitate a testing process), etc.

Figure 1:
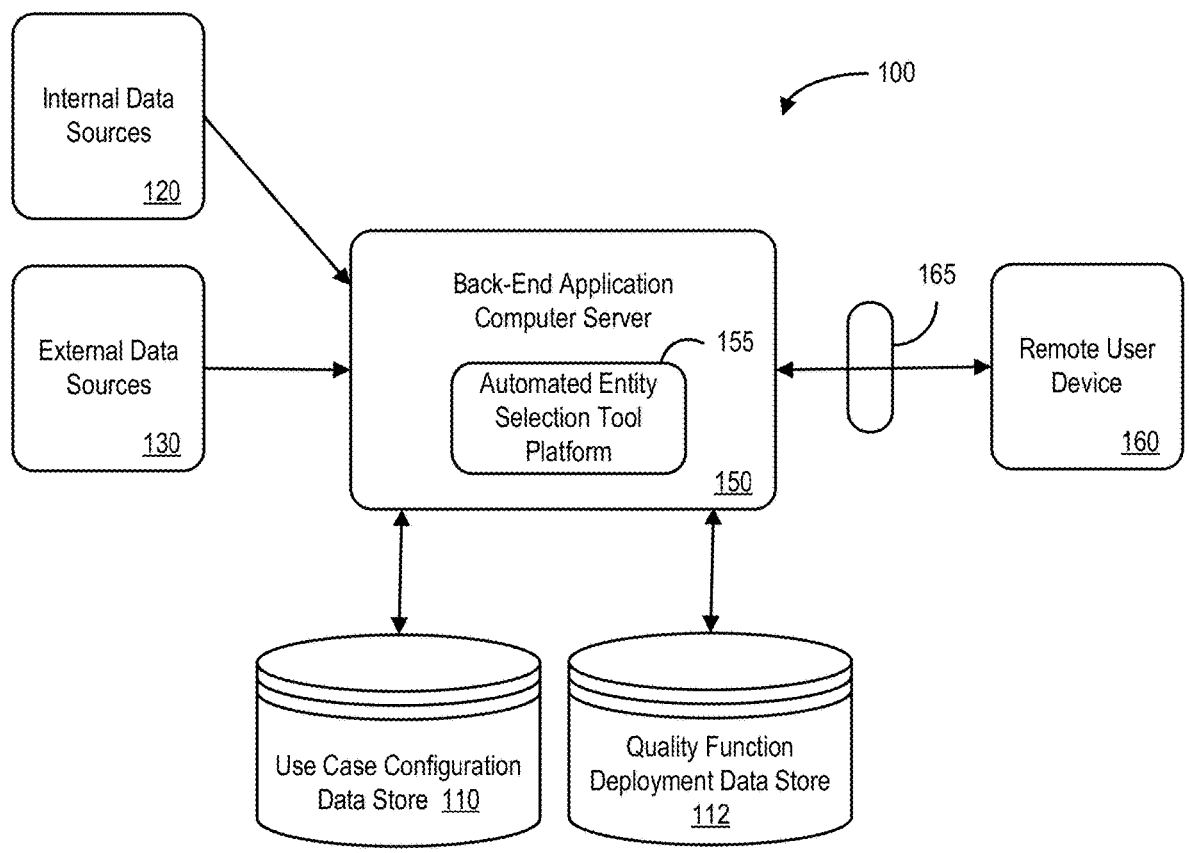
FIG. 1 is a high-level block diagram of a system architecture in accordance with some embodiments.

For example, FIG. 1 is a high-level block diagram of a system 100 according to some embodiments of the present invention. In particular, the system 100 includes a back-end application computer 150 server that may access information in a use case configuration data store 110 and a quality function deployment data store 112 (e.g., storing a set of electronic records that represent test data and/or performance data, each record including, for example, one or more relationship identifiers, use case parameters, score results, scoring matrixes, communication addresses, etc.). The back-end application computer server 150 may also retrieve information from internal data sources 120 (e.g., internal to an insurance company) and/or external data sources 130 (e.g., third-party data) in connection with an automated entity selection tool platform 155. According to some embodiments, the system 100 further applies machine learning, artificial intelligence algorithms, business logic, and/or other models to the electronic records. The back-end application computer server 150 may also exchange information with a remote user device 160 associated with an enterprise operator, administrator, representative of an entity, etc. (e.g., via communication port 165 that might include a firewall). According to some embodiments, an interactive graphical user interface platform of the back-end application computer server 150 (and, in some cases, third-party data) may facilitate the display of information associated with the automated entity selection tool platform 155 via one or more remote computers (e.g., to enable a manual review of automatically generated communications) and/or the remote user device 160. For example, the remote user device 160 may receive updated information (e.g., a summary report and/or performance information) from the back-end application computer server 150. Based on the updated information, a user may review the data from the use case configuration data store 110 and/or quality function deployment data store 112 and take informed actions in response to communications. Note that the back-end application computer server 150 and/or any of the other devices and methods described herein might be associated with a cloud-based environment and/or a vendor that performs a service for an enterprise.

The back-end application computer server 150 and/or the other elements of the system 100 might be, for example, associated with a Personal Computer ("PC"), laptop computer, smartphone, an enterprise server, a server farm, and/or a database or similar storage devices. According to some embodiments, an "automated" back-end application computer server 150 (and/or other elements of the system 100) may facilitate communications with remote user devices 160 and/or updates of electronic records in the use case configuration data store 110 and quality function deployment data store 112. As used herein, the term "automated" may refer to, for example, actions that can be performed with little (or no) intervention by a human.

As used herein, devices, including those associated with the back-end application computer server 150 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The back-end application computer server 150 may store information into and/or retrieve information from the use case configuration data store 110 and/or quality function deployment data store 112. The use case configuration data store 110 and/or quality function deployment data store 112 might, for example, store electronic records representing a plurality of relationships and/or potential relationships, each electronic record having a relationship identifier, use case parameters, score results, communication addresses, etc. The use case configuration data store 110 and/or quality function deployment data store 112 may also contain information about prior and current interactions with entities, including those associated with the remote user devices 160

(e.g., user preference values associated with data formats, protocols, etc.). The use case configuration data store 110 and/or quality function deployment data store 112 may be locally stored or reside remote from the back-end application computer server 150. As will be described further below, the use case configuration data store 110 and quality function deployment data store 112 may be used by the back-end application computer server 150 in connection with an interactive user interface to provide information about the automated entity selection tool platform 155. Although a single back-end application computer server 150 is shown in FIG. 1, any number of such devices may be included. Moreover, various devices described herein might be combined according to embodiments of the present invention. For example, in some embodiments, the back-end application computer server 150, the use case configuration data store 110, and/or the quality function deployment data store 112 might be co-located and/or may comprise a single apparatus.

In this way, the system 100 may provide an ability to compare and evaluate the performance of multiple entities to help select the most appropriate entity for a particular task. For example, an insurer might select the best vendor to help develop SaaS applications. As used herein, the phrase SaaS applications might refer to, for example, a licensing and/or delivery approach in which software is centrally hosted (sometimes referred to as "on-demand software") and might include similar products such as Web-based software, on-demand software, hosted software, Infrastructure as a Service ("IaaS"), Platform as a Service ("PaaS"), Desktop as a Service ("DaaS"), Database as a Service ("DBaaS"), Managed Software as a Service ("MSaaS"), Mobile Backend as a Service ("MBaaS"), Information Technology Management as a service ("ITMaaS"), etc.

Figure 2:
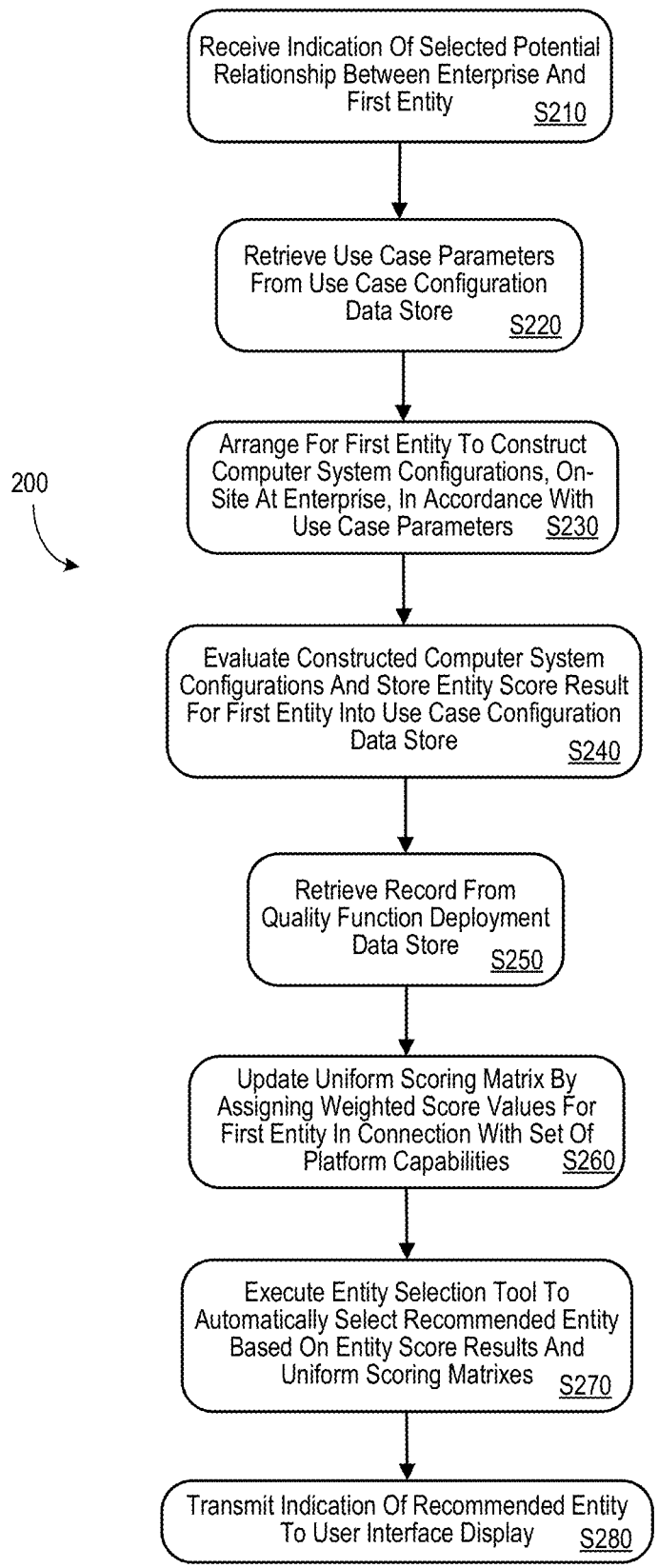
FIG. 2 illustrates a method according to some embodiments of the present invention.

Note that the system 100 of FIG. 1 is provided only as an example, and embodiments may be associated with additional elements or components. FIG. 2 illustrates a method 200 that might be performed by some or all of the elements of the system 100 described with respect to FIG. 1, or any other system, according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S210, receiving, at the back-end application computer server, from a remote user device, an indication of a selected potential relationship between the enterprise and a first entity. At S220, the system may retrieve, from a use case configuration data store, an electronic record associated with the selected potential relationship. The retrieved record might include, for example, use case parameters (e.g., test situations to be implemented by the first entity). Note that the use case configuration data store may contain electronic records that represent a plurality of potential relationships between the enterprise and at least one entity, and each electronic record may include an electronic record identifier, use case parameters, and an entity score result.

At S230, the system may arrange for the first entity to construct a plurality of computer system configurations (e.g., SaaS applications), on-site at the enterprise, in accordance with the use case parameters. For example, SaaS implementations might be constructed on-site at the enterprise over multiple days in an enterprise sandbox environment.

At S240, the system may evaluate the constructed computer system configurations and store an entity score result for the first entity into the use case configuration data store. The score results might be associated with, for example, a use case score result, a daily score result, an overall score result, etc.

At S250, the system may retrieve, from a quality function deployment data store, an electronic record associated with the first entity. The quality function deployment data store may contain, for example, electronic records that represent the plurality of potential relationships, and each electronic record might include an electronic record identifier and a uniform scoring matrix. The uniform scoring matrix might include, for example, information associated with: billing capability, cloud and platform network capability, digital capability, integration capability, operations capability, privacy and security capability, product, data, and reporting capability, product, publishing, and electronic data management capability, product, rating, and modeling capability, strategic alignment capability, system operations and Information Technology ("IT") service management capability, etc.

According to some embodiments, the enterprise is associated with an insurance provider. In this case, the uniform scoring matrix in the quality function deployment data store might include information associated with digital capability for an insurance customer interface, such as User Interface ("UI") configurability, AB multi-variant testing, on-line and off-line partial insurance quotes, click-to-call or click-to-chat (e.g., with an insurance Customer Service Representative ("CSR"), session playback, etc.

At S260, the system may update the uniform scoring matrix by assigning weighted score values for the first entity in connection with a set of platform capabilities. At S270, the system may execute an entity selection tool to automatically select a recommended entity based on entity score results and uniform scoring matrixes. Note that the recommended entity might also be based on other factors, such as costs (e.g., implementation and run time computational, memory, Input Output ("IO"), monetary, etc.), entity reputation, a security assessment, a technical architecture assessment, a financial assessment (e.g., the financial health of the entity), and/or customer feedback interviews (e.g., with other businesses that have worked with the entity). According to some embodiments, the recommended entity is further a technical questionnaire, at least one specification provided by an entity, a response to an RFP, an industry resource, etc. At S280, an indication of the recommended entity may be transmitted to an interactive Graphical User Interface ("GUI") display via a distributed communication network.

Figure 3:
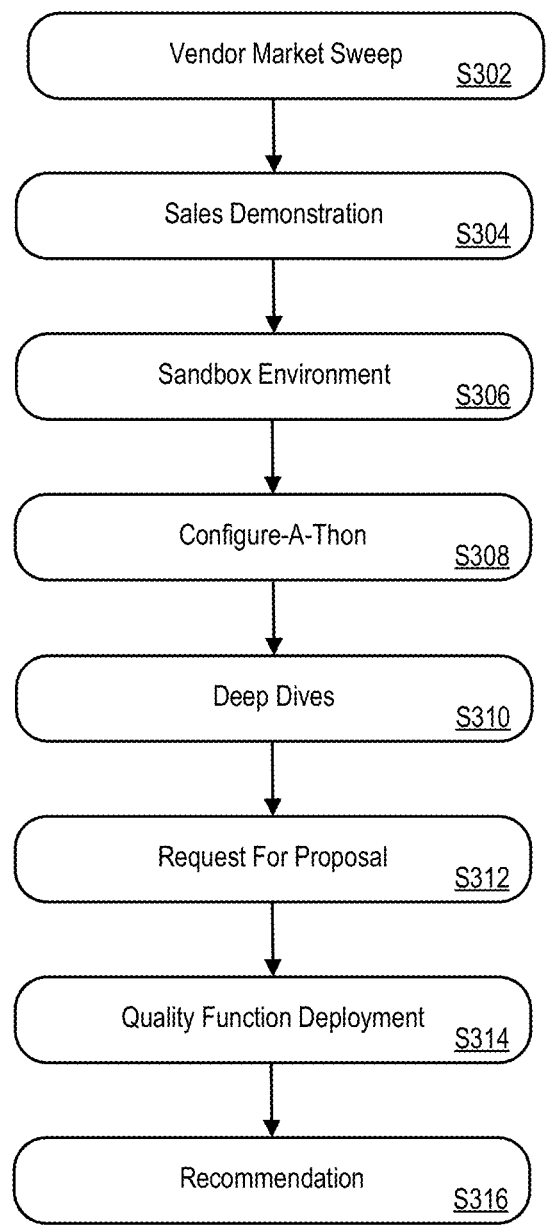
FIG. 3 is a vendor selection process in accordance with some embodiments.

FIG. 3 is a vendor selection process in accordance with some embodiments. At S302, a vendor marketسweep may be performed to identify a set of potential entities that might be a good fit for a relationship with the enterprise. The vendor market sweep might utilize leveraged prior research (e.g., from industry research firms and/or reviews) and a "bakeoff" process (e.g., a competition held by the enterprise to identify potential vendors).

At S304, a sales demonstration may provide an opportunity for various vendors to share their end-to-end screen flow and built-in capabilities. This process may help the enterprise put a face to the name for new stakeholders. At S306, a sandbox may represent an open SaaS instance of vendor Out-Of-The-Box ("OOTB") product abilities that is provided to an enterprise team to help them test and learn the computing platform (e.g., to help provide that the SaaS platform is potentially appropriate.

At S308, a test or "configure-a-thon" might be performed. For example, an entity might need to implement multiple use cases (e.g., forty different scenarios) that are carefully designed to test vendor capabilities through "simulated" product and time/resource constrained delivery situations. Various elements of the configure-a-thon may then be scored based on the performance of each entity. At S310, the enterprise might perform deep dives to spend focused time understanding the true capabilities vendors have OOTB for key functions (e.g., digital and data capabilities).

At S312, an RFP may be issued to determined full integrated insurance suite pricing based on, Minimum Viable Product ("MVP") requirements, a sample product, workflow and capability expectations, etc. At S314, a Quality Function Deployment may help capture all scores from the process and weigh each score by importance. At S316, a recommendation may be automatically generated based on QFD scores, price information, entity reputation, strategic alignment factors, etc.

Note that other activities may be performed in parallel with the process described in connection with FIG. 3. For example, the enterprise might perform a security assessment, a technical architecture assessment, financial assessment (e.g., of vendor business health), customer feedback interviews (e.g., with the vendor's other clients and customers), a business and/or technical high-level design review, etc.

The configure-a-thon performed at S308 may be carefully engineered to demonstrate an entity's true performance limitations and create apples-to-apples entity selection results associated with platform capabilities. For example, multiple use cases may be spread across multiple days (e.g., forty use cases over four days). The vendors might only know the general topics to be covered (e.g., so participant skills can be selected as needed). Each set of daily requirements might only be revealed on the day it is implemented.

According to some embodiments, this vendor test might be "time boxed," such as there may be a firm requirement that vendors can only work from 8:30 AM to 5:00 PM (e.g., showing up in person with enterprise representatives in the room or via SKYPE®). The test might be associated with a simulated product that is analogous to an actual insurance application (e.g., implementing a "Happy Meter" and underwriting rules for "a number of dwarves and trolls" to ensure that no work could be done previously).

Some embodiments may be associated with constrained resources (e.g., limited to four selected workers for any given day) and/or a "target scope." For example, a targeted scope for one or more days might represent a progressive layering of additional capabilities to see more complex use cases (e.g., such as rating across multiple variables). The specific use cases may be selected to expose common platform failure points, such as cascading data model challenges and/or hard-coded screen-to-database relationships. The overall content of the use cases may also be aligned to the types of changes an enterprise expects when configuring a partner product (e.g., proprietary workflows, underwriting, output, data and the speed of front-to-back rating changes).

Vendors may be required to demonstrate an ability to "build" and/or upgrade changes and understand OOTB software development and IT operations ("DevOps") practices that shorten a system's development life cycle and provide continuous delivery with high software quality. According to some embodiments, the enterprise may position a cross-functional team in the room (e.g., including business function leaders, technical leads, architects, etc.) to provide daily reviews of performance. For example, a vendor may be given a chance to playback what/why/where it struggled and succeeded in the testing process. The team may generate daily Quality Assurance ("QA") and/or User Acceptance Testing ("UAT") scores for the formal test cases that are designed to create objective and empirical scoring.

Figure 4:
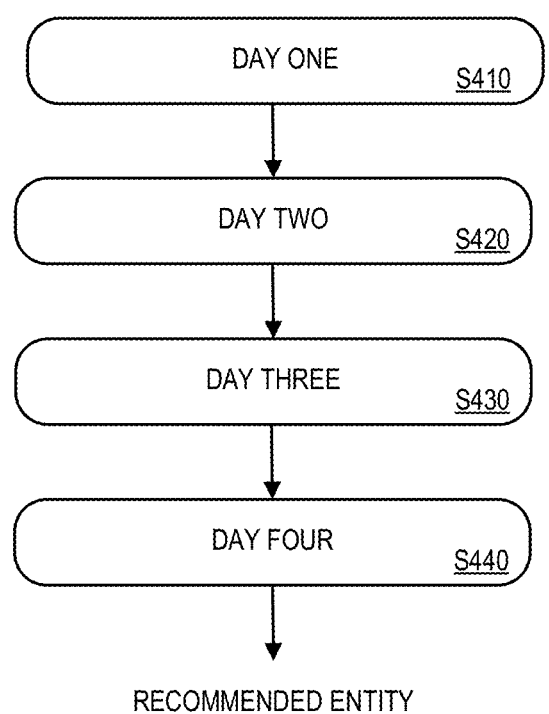
FIG. 4 is a daily schedule for a configure-a-thon according to some embodiments.

According to some embodiments, the configure-a-thon takes place over multiple days to ensure that a thorough test of a computer platform's capabilities can performed. For example, FIG. 4 is a daily schedule for a configure-a-thon according to some embodiments. In the day one schedule S410, the test might work through an automobile insurance quote flow. The entity should be ready to discuss and/or update things such as vehicles, drivers, coverages, discounts, etc. During this process, the entity might also be asked to cover automobile rating and underlying underwriting processes.

Figure 5:
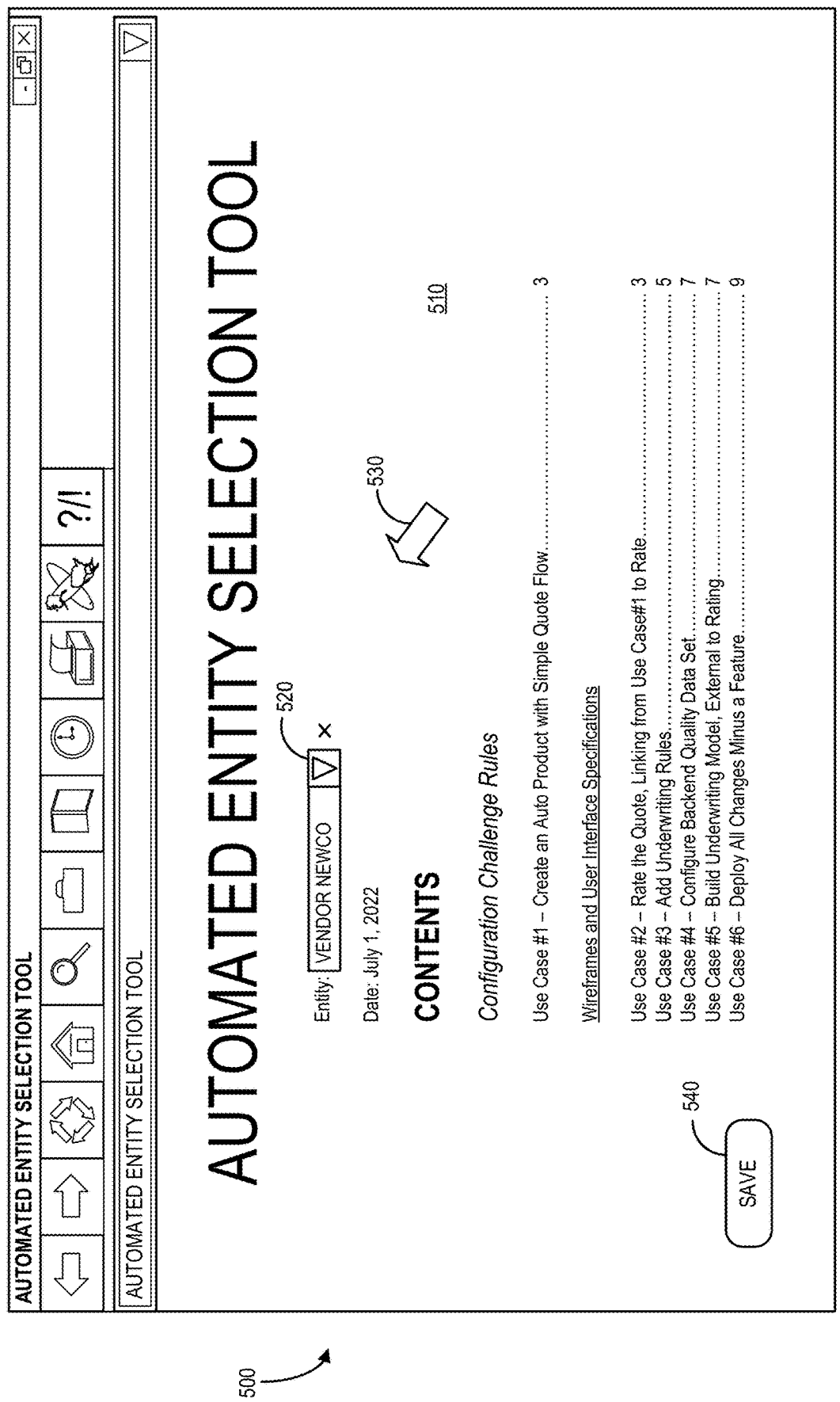
FIG. 5 is an entity selection tool display in accordance with some embodiments.

For example, FIG. 5 is an entity selection tool GUI display 500 in accordance with some embodiments. The display 500 might provide an overall interface 510 of an entity selection tool including a table of contents of use cases that will be covered on the first day. The interface 510 might include, for example, an entity identifier 520 (e.g., selected from a dropdown menu via a touchscreen or computer mouse pointer 530) and a "Save" icon 540 that might be used to store intermediate results and/or to upload a SaaS application to the tool for automatic evaluation. According to some embodiments, selection of an element (e.g., via touchscreen or a computer mouse pointer 530) might result in a pop-up window providing additional information about that element (e.g., linking to data sources, algorithm parameters, etc.). FIG. 6 shows a display 600 that shows detailed requirements 610 for a use case. The requirements 610 might include, for example, one or more attachments 620 (e.g., an EXCEL® spreadsheet application file) to outline further UI specifications. Moreover, a "Submit" icon 630 may let an entity provide a final SaaS application for automatic evaluation.

Referring again to FIG. 4, the day two schedule S420 may work through an Application Programming Interface ("API") integration of a third-party data element in the automobile quote that isn't currently available in the offering. The enterprise might also evaluate reporting capabilities, including this third-party data, element once it is integrated. The day three schedule S430 might focus on user type administration (e.g., configuring the difference between user types such as customer vs. agent vs. CSR vs. underwriter with respect to the authority to manipulate risk variables). Along with this, the entity may discuss/update billing for an automobile policy including (but not limited to) different payment plans, cancellation for non-payment, billing output, etc. The day four (and final) schedule S440 might consist of customer communications and output (both print and digital). The use case might create specific output types, such as a declarations page and an ability to send output along a preferred communication channel. The entity might also configure a customer web portal to be able to perform the quote from the day one S410 and day schedules S420 (e.g., matching those premiums).

Note that each configure-a-thon day may include a full build of the mock product requirements, including wireframes, rating variables, underwriting rules, etc. In some embodiments, a Quality Function Deployment ("QFD") may supplement the configure-a-thon score results. For example, FIG. 7 is a QFD uniform scoring matrix 700 according to some embodiments listing various functional areas 710. The QFR uniform scoring matrix 700 may represent a systemic approach to map enterprise needs into measurable system platform capabilities using quantitative and qualitative inputs. A QFD uniform scoring matrix 700 lets an enterprise provide a weight 720 (as well as an assigned score 730) for evaluation criteria, establishing a clear line between the relative importance of a capability or functional area 710 and the objective scoring to determine a recommended vendor platform.

Key capabilities and functional areas 710 may be identified for vendor platform entity selection and then scored through a variety of inputs (configure-a-thon score results, technical assessments, RFP, etc.). According to some embodiments, score might be performed on a 1 through 10 scale, a 1/3/9 scale, etc. The assigned score 730 (e.g., a cumulative total of objective scoring data by a cross-functional enterprise assessment team) may then be multiplied by the weight to 720 produce a final calculated score 740. Note that weight 720 might be is dependent on business priority, technical solution, alignment to personal lines strategy, etc.

Figure 8:
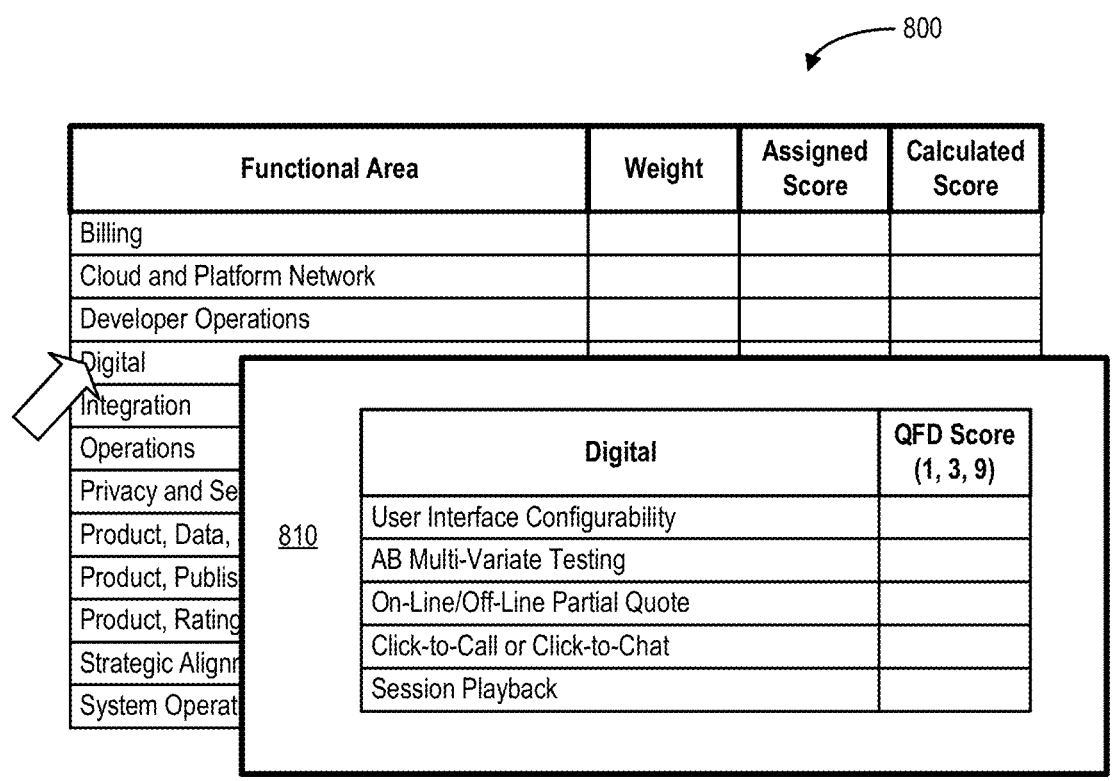
FIG. 8 shows digital functional details in accordance with some embodiments.
Figure 9:
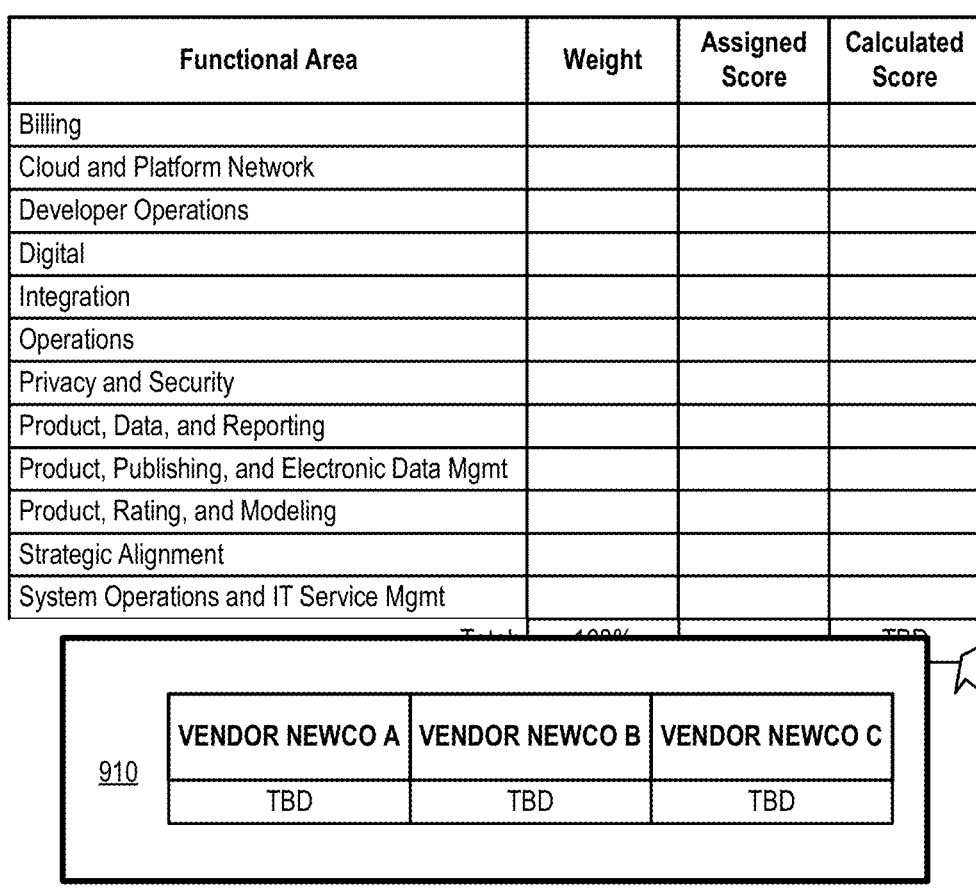
FIG. 9 shows overall scores for multiple vendors according to some embodiments.

According to some embodiments, the QFD uniform scoring matrix 700 is "interactive" in that selection of a portion of the display (e.g., via a touchscreen or computer mouse pointer 750) by a user might result in additional information being displayed. For example, selection of the "Digital" functional area 710 in the display might result in FIG. 8, which shows a matrix 800 with digital functional details 810 provided in accordance with some embodiments. Similarly, selection of a "Total" calculated score might result in FIG. 9, which shows a matric 900 with overall scores for multiple vendors 910 (NEWCO A, NEWCO B, and NEWCO C) according to some embodiments.

Figure 10:
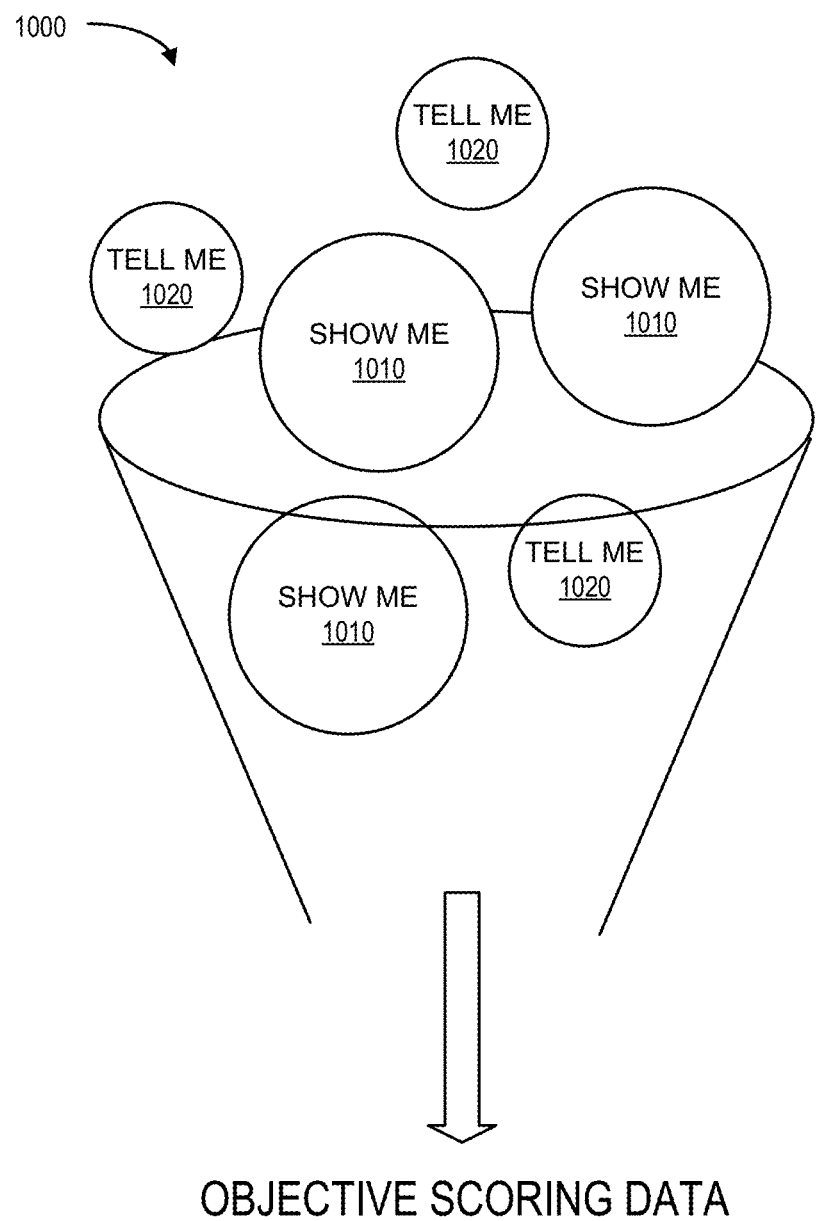
FIG. 10 shows scoring inputs in accordance with some embodiments.

FIG. 10 shows scoring inputs 1000 in accordance with some embodiments. The scoring inputs 1000 include both "show me" data 1010 and "tell me" data 1020. The "show me" data 1010 might include configure-a-thon scores, technical and functional deep dives, vendor platform sandbox reviews, etc. In general, the "show me" data 1010 represents an actual demonstration of implementation on demand, giving the enterprise first-hand knowledge or experience of the capability. This type of data may be treated as a higher quality source than information requested in other scoring processes.

The "tell me" data 1020 might include answers provided by entities in response to a technical questionnaire, additional specifications provided by vendors (e.g., performance white papers), current customer interviews, responses to an RFP, financial assessments (e.g., using third-party credit score data), industry resources (e.g., vendor evaluation services), other internal enterprise projects, etc. In general, the "tell me" data 1020 may be associated with documents and processes that provide additional information (but did not provide first-hand observation or knowledge of the capabilities).

Figure 11:
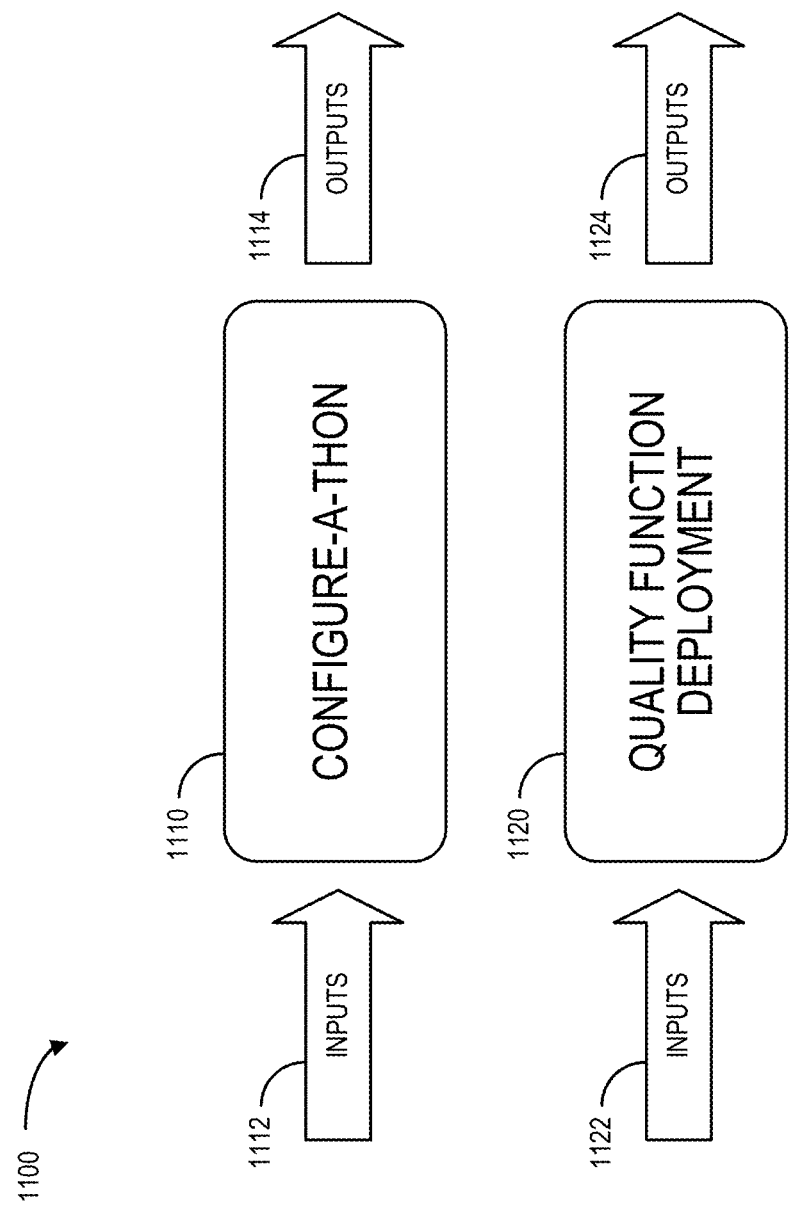
FIG. 11 are evaluation and selection process and criteria according to some embodiments.

FIG. 11 illustrates evaluation and selection processes and criteria 1100 according to some embodiments. A configure-a-thon 1110 may receive inputs 1112, such as multiple use cases that are provided to the vendor to configure and undergo QA testing, and generate outputs 1114, such as a configurability assessment based on live configuration and solution flexibility demonstrations. A QFD 1120 may also receive inputs 1122, such as deep dive workshops, sandbox trainings, client interviews, RFP responses, and presentations, and generate outputs 1124, such as a consistent, uniform scoring matrix for all capabilities within a SaaS indicating how appropriate a platform is for an "insurance out of the box" solution.

Other criteria 1100 might including supporting data, such as delivery and governance data (e.g., associated with an operating model, a resource plan, and an agile methodology), relationship information (e.g., associated with engagement, partnership, thought leadership, and an ability to execute an effective contract), a third-party security assessment (e.g., associated with performance of a security assessment), a business continuity assessment (e.g., associated with a business continuity assessment performed by a business resiliency office), a financial analysis (e.g., associated with a financial solvency report to ensure minimal risk to the enterprise), etc.

Figure 12:
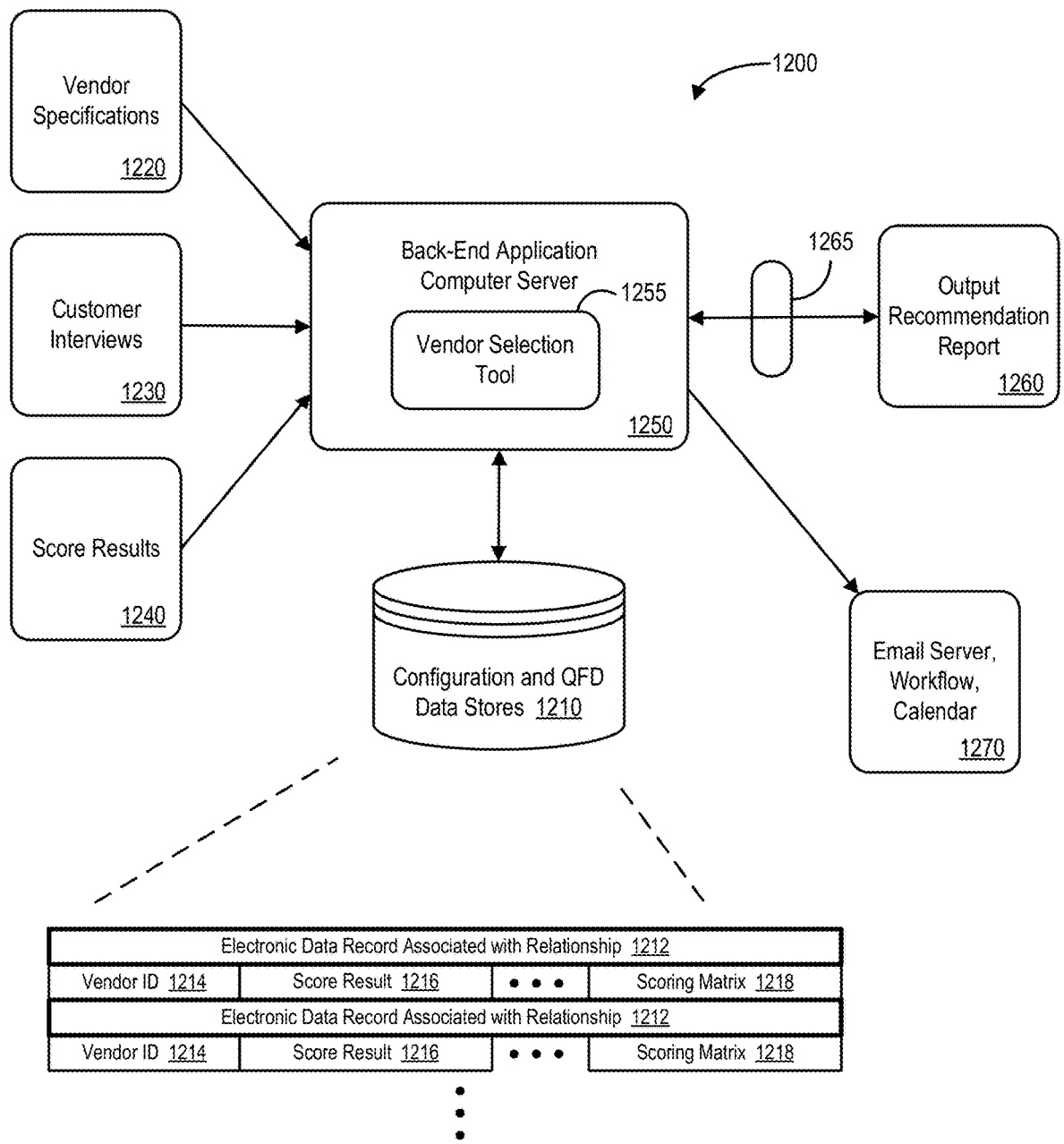
FIG. 12 is a more detailed high-level block diagram of a system architecture in accordance with some embodiments.

FIG. 12 is a more detailed high-level block diagram of a system 1200 in accordance with some embodiments. As before, the system 1200 includes a back-end application computer server 1250 that may access information in configuration and QFD data stores 1210. The back-end application computer server 1250 may also retrieve information from vendor specifications 1220 (e.g., white papers, on-line tutorials, sales brochures), customer interviews 1230, and/or score results 1240 in connection with an automated entity selection tool 1255. Note that various data elements from the configuration and QFD data stores 1210, vendor specifications 1220, customer interviews 1230, and score results 1240 might be combined, merged, verified, etc. The back-end application computer server 1250 may also exchange information via communication links to transmit output recommendation reports 1260 (e.g., indicating a preferred vendor via a communication port 1265 that might include a firewall). The back-end application computer server 1250 might also transmit information directly to an email server (e.g., to send or receive information from vendors), a workflow application, and/or a calendar application 1270 (e.g., to schedule configure-a-thon events) to facilitate automated communications and/or other system actions.

The back-end application computer server 1250 may store information into and/or retrieve information from the configuration and QFD data stores 1210. The configuration and QFD data stores 1210 might, for example, store electronic records 1212 representing a plurality of entities, each electronic record including a vendor identifier 1214, score results 1216, a communication address, a scoring matrix 1218, etc. According to some embodiments, the system 1200 may also provide a dashboard view of a selection process and/or supporting material (e.g., including historical selections and eventual performance to help train a machine learning vendor selection algorithm, etc.).

Figure 13:
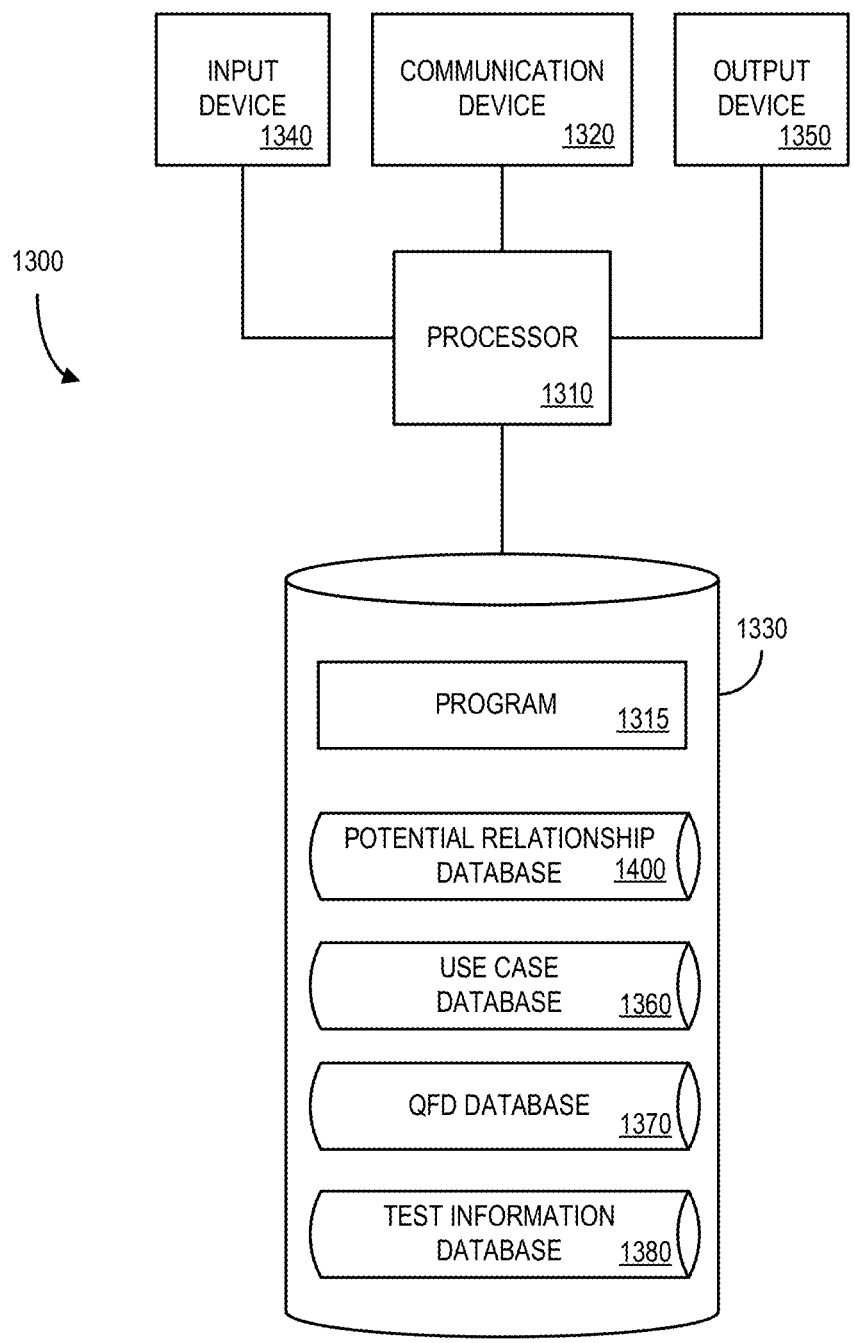
FIG. 13 is a block diagram of an apparatus in accordance with some embodiments of the present invention.

The embodiments described herein may be implemented using any number of different hardware configurations. For example, FIG. 13 illustrates an apparatus 1300 that may be, for example, associated with the systems 100, 1200 described with respect to FIGS. 1 and 12, respectively. The apparatus 1300 comprises a processor 1310, such as one or more commercially available Central Processing Units ("CPUs") in the form of one-chip microprocessors, coupled to a communication device 1320 configured to communicate via communication network (not shown in FIG. 13). The communication device 1320 may be used to communicate, for example, with one or more remote administrator computers and or communication devices (e.g., PCs and smartphones). Note that communications exchanged via the communication device 1320 may utilize security features, such as those between a public internet user and an internal network of the insurance enterprise. The security features might be associated with, for example, web servers, firewalls, and/or PCI infrastructure. The apparatus 1300 further includes an input device 1340 (e.g., a mouse and/or keyboard to enter information about entity score results, rules and logic, etc.) and an output device 1350 (e.g., to output reports regarding vendor recommendations and entity selection summaries).

The processor 1310 also communicates with a storage device 1330. The storage device 1330 may comprise any appropriate information storage device, including combinations of magnetic storage devices (e.g., a hard disk drive), optical storage devices, mobile telephones, and/or semiconductor memory devices. The storage device 1330 stores a program 1315 and/or a resource allocation tool or application for controlling the processor 1310. The processor 1310 performs instructions of the program 1315, and thereby operates in accordance with any of the embodiments described herein. For example, the processor 1310 might receive an indication of a selected potential relationship and retrieve an electronic record for that relationship. The first entity may then construct computer system configurations in accordance with use case parameters. The processor 1310 may be used to evaluate the constructed computer system configurations, and an entity score result for the first entity may be stored. The processor 1310 may also retrieve an electronic record associated with the first entity and update a uniform scoring matrix by assigning weighted score values for the first entity in connection with a set of platform capabilities. An entity selection tool may be executed by the processor 1310 to automatically select a recommended entity based on the score results and scoring matrixes, and an indication of the recommended entity may be transmitted.

The program 1315 may be stored in a compressed, uncompiled and/or encrypted format. The program 1315 may furthermore include other program elements, such as an operating system, a database management system, and/or device drivers used by the processor 1310 to interface with peripheral devices.

As used herein, information may be "received" by or "transmitted" to, for example: (i) the back-end application computer server 1300 from another device; or (ii) a software application or module within the back-end application computer server 1300 from another software application, module, or any other source.

In some embodiments (such as shown in FIG. 13), the storage device 1330 further stores a potential relationship database 1400 (e.g., containing insurance policy information), a use case database 1360, a QFD database 1370, and a test information database 1380. An example of a database that might be used in connection with the apparatus 1300 will now be described in detail with respect to FIG. 14. Note that the database described herein is only an example, and additional and/or different information may be stored therein. Moreover, various databases might be split or combined in accordance with any of the embodiments described herein. For example, the potential relationship database 1400 and the use case 1360 might be combined and/or linked to each other within the program 1315.

Figure 14:
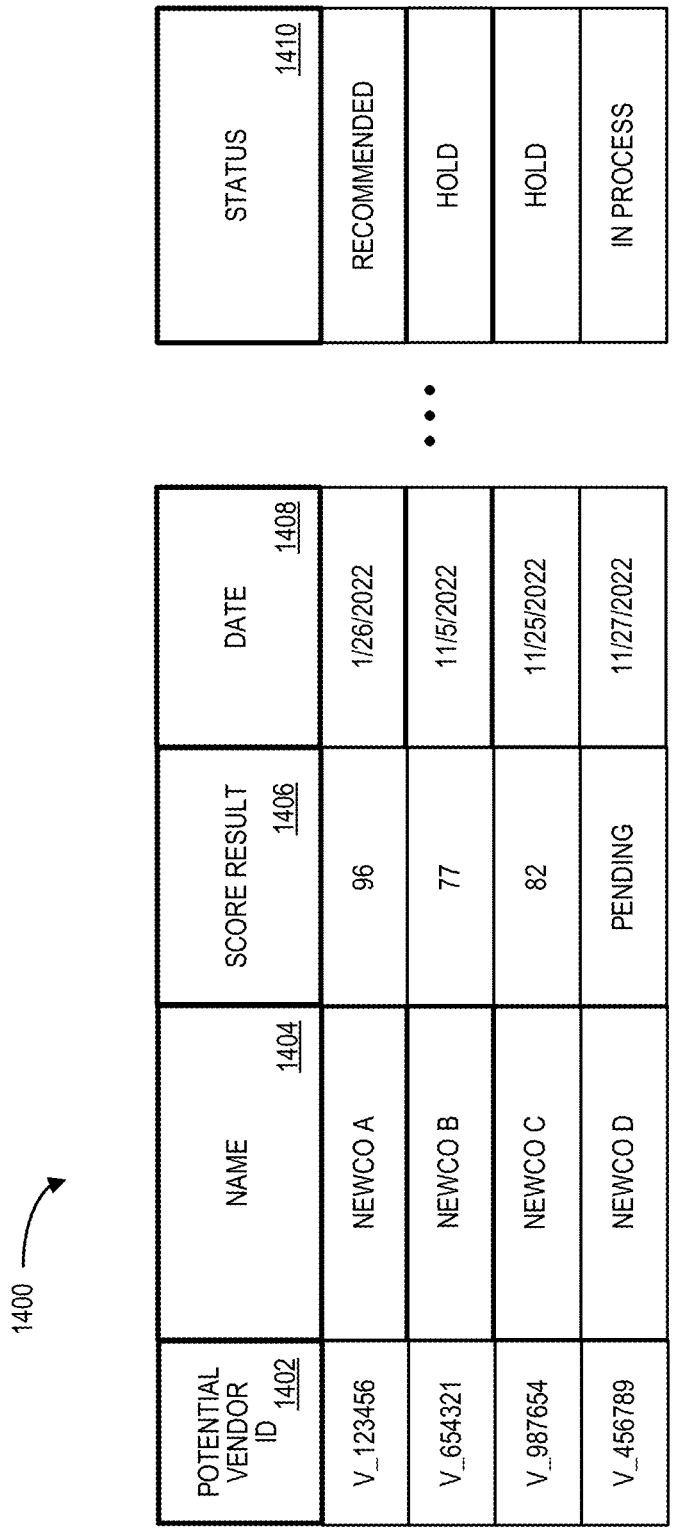
FIG. 14 is a portion of a tabular potential relationship database according to some embodiments.

Referring to FIG. 14, a table is shown that represents the potential relationship database 1400 that may be stored at the apparatus 1300 according to some embodiments. The table may include, for example, entries associated with a potential insurance SaaS vendor. The table may also define fields 1402, 1404, 1406, 1408, 1410 for each of the entries. The fields 1402, 1404, 1406, 1408, 1410 may, according to some embodiments, specify: a potential vendor identifier 1402, a name 1404, a score result 1406, a date 1408, and a status 1410. The potential relationship database 1400 may be created and updated, for example, based on information electrically received from various operators, administrators, and computer systems (e.g., including those representing score results) that may be associated with an insurer.

The potential vendor identifier 1402 may be, for example, a unique alphanumeric code identifying a vendor (having the name 1404) who might be asked to help develop a SaaS application for an enterprise. The score result 1406 might indicate, for example, "show me" or "tell me" information about that vendor's performance (e.g., during a configure-a-thon). The date 1408 might indicate when the vendor was evaluated, and the status 1410 might indicate if a vendor was "selected" (as the most appropriate vendor), on "hold" (e.g., not selected), is still undergoing a review that is "in process," etc.

Thus, embodiments may provide an automated and efficient way for an entity selection tool platform to allow for faster, more accurate results as compared to traditional approaches. Embodiments may improve the experience of an enterprise when developing a SaaS application, and, eventually, of customers who may use the SaaS application.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with embodiments of the present invention (e.g., some of the information associated with the displays described herein might be implemented as a virtual or augmented reality display and/or the databases described herein may be combined or stored in external systems). Moreover, although embodiments have been described with respect to particular types of insurance policies, any of the embodiments may instead be associated with other types of insurance policies in addition to and/or instead of the policies described herein (e.g., professional liability insurance policies, extreme weather insurance policies, new business, policy renewals, issued policies, etc.). Similarly, although certain attributes (e.g., insurance policy values) were described in connection some embodiments herein, other types of attributes might be used instead.

Figure 15:
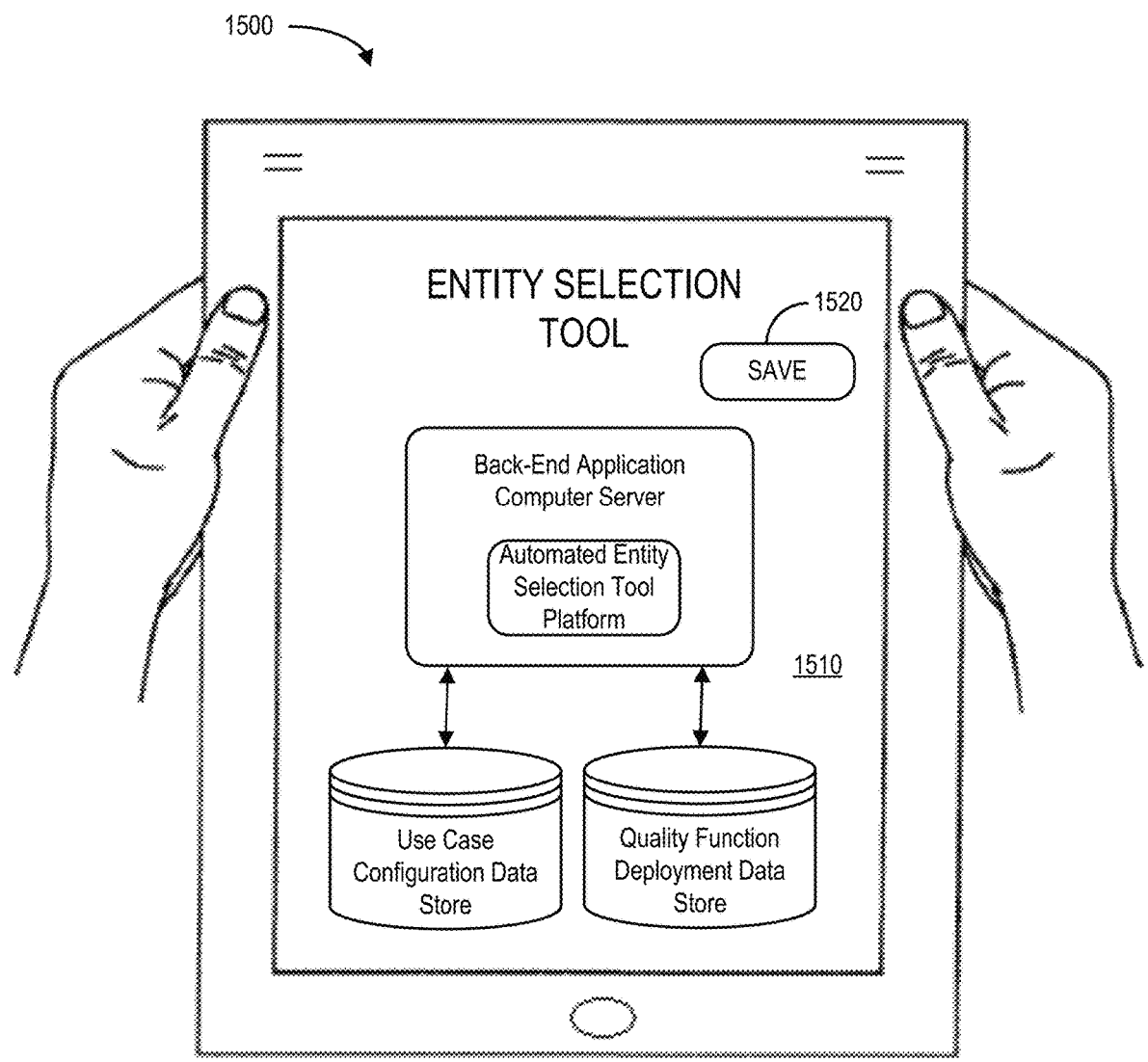
FIG. 15 illustrates a tablet computer displaying an automated entity selection tool user interface according to some embodiments.

Further, the displays and devices illustrated herein are only provided as examples, and embodiments may be associated with any other types of user interfaces. For example, FIG. 15 illustrates a handheld tablet computer 1500 showing an automated entity selection tool display 1510 according to some embodiments. The entity selection tool display 1510 might include user-selectable data that can be highlighted and/or modified by a user of the handheld computer 1500 to provide information about potential relationship entity selections (e.g., score results). Moreover, selection of a "Save" icon 1520 may store the values to be used by any of the embodiments described herein, initiate an automatic vendor selection process, etc.

Note that the displays described herein might be constantly updated based on new information (e.g., as data is received by the insurer). For example, the displays might be updated in substantially real time or on a periodic basis (e.g., once each night). According to some embodiments, an enterprise might be able to select a particular time in the past and the displays may be updated to reflect the information as it previously existed at that particular time (e.g., what vendor would have would have been selected one month ago?).

Embodiments may utilize automated testing scripts or scenarios (e.g., to help ensure that there was no advance notice about the use case scenarios or requirements of a particular test) and/or automated scoring of computer configurations created by vendors (e.g., automated entity score results and/or uniform scoring matrix data to help ensure objective evaluations). In addition, an online "landing zone" might be provided where vendors can "check-in" and "check-out" various documents and/or files (e.g., to help monitor exactly how long materials were available to each vendor). Similarly, testing scripts or scenarios may be "locked down" and isolated in a cloud-based storage to help prevent unauthorized access and/or assistance by other parties. According to some embodiments, testing scripts or scenarios might use third-party data (e.g., a use case might involve retrieving and processing a large amount of information from a department of motor vehicles or a weather service).

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed:

1. A system to provide an entity selection tool platform via a back-end application computer server of an enterprise, comprising:
    (a) a use case configuration data store containing electronic records that represent a plurality of potential relationships between the enterprise and at least one entity, wherein each electronic record of the use case configuration data store includes an electronic record identifier, use case parameters defining test situations adapted for implementation by the at least one entity, and an entity score result of the at least one entity;
    (b) a quality function deployment data store containing electronic records that represent the plurality of potential relationships, wherein each electronic record of the quality function deployment data store includes an electronic record identifier and a uniform scoring matrix;
    (c) a storage device storing processor-executable program code;
    (d) the back-end application computer server including a processor, coupled to the use case configuration data store, the quality function deployment data store, and the storage device, the processor to execute the processor-executable program code in order to cause the back-end application computer server to:
        (i) arrange for a first entity associated with a remote user device to construct a plurality of computer system configurations, on-site at the enterprise, in accordance with an automated testing script of the use case parameters,
        (ii) automatically evaluate the constructed computer system configurations and store an entity score result for the first entity into the use case configuration data store,
        (iii) retrieve, from the quality function deployment data store, an electronic record associated with the first entity,
        (iv) update a uniform scoring matrix included in the retrieved electronic record by assigning weighted score values for the first entity in connection with a set of platform capabilities of the enterprise,
        (v) execute the entity selection tool to automatically select a recommended entity based at least on the entity score result and the updated uniform scoring matrix of the first entity, and
        (vi) transmit an indication of the recommended entity; and
    (e) a communication port coupled to the back-end application computer server to facilitate an exchange of data with the remote user device in support of an interactive graphical user interface display via security features and a distributed communication network, the interactive graphical user interface display including the recommended entity.

2. The system of claim 1, wherein the interactive graphical user interface display includes entity score results and uniform scoring matrices.

3. The system of claim 1, wherein the entity score is based on show me data and tell me data.

4. The system of claim 3, wherein
    the show me data includes the constructed computer system configurations, a technical score, a functional score, and a sandbox review score; and
    the tell me data includes data provided in response to questions unassociated with the automatic evaluation of the constructed computer system configurations.

5. The system of claim 1, wherein the automated testing script of the use case parameters is associated with a simulated product that is analogous to an actual product.

6. The system of claim 1, wherein the automated testing script of the use case parameters is configured to expose common platform failure points.

7. The system of claim 1, wherein the constructed computer system configurations are associated with Software as a Service ("SaaS") implementations for various use cases.

8. The system of claim 7, wherein the SaaS implementations are constructed on-site at the enterprise over multiple days.

9. The system of claim 8, wherein the SaaS implementations are constructed in an enterprise sandbox environment.

10. The system of claim 1, wherein the recommended entity is further based on at least one of:
    (i) a technical questionnaire,
    (ii) at least one specification provided by the first entity,
    (iii) a response to a request for proposal, and
    (iv) an industry resource.

11. A computerized method to provide an entity selection tool platform via a back-end application computer server of an enterprise, comprising:
    providing a use case configuration data store containing electronic records that represent a plurality of potential relationships between the enterprise and at least one entity, wherein each electronic record of the use case configuration data store includes an electronic record identifier, use case parameters defining test situations adapted for implementation by the at least one entity, and an entity score result of the at least one entity;
    providing a quality function deployment data store containing electronic records that represent the plurality of potential relationships, wherein each electronic record of the quality function deployment data store includes an electronic record identifier and a uniform scoring matrix;

arranging, by the backend application computer server, for a first entity associated with a remote user device to construct a plurality of computer system configurations, on-site at the enterprise, in accordance with an automated testing script of the use case parameters;

automatically evaluating, by the backend application computer server, the constructed computer system configurations and storing an entity score result for the first entity into a use case configuration data store;

retrieving, by the backend application computer server from the quality function deployment data store, an electronic record associated with the first entity;

updating, by the backend application computer server, a uniform scoring matrix included in the retrieved electronic record by assigning weighted score values for the first entity in connection with a set of platform capabilities of the enterprise;

executing, by the backend application computer server, the entity selection tool to automatically select a recommended entity based at least on the entity score result and the updated uniform scoring matrix of the first entity; and transmitting, by the backend application computer server, an indication of the recommended entity to an interactive graphical user interface display of the remote user device via security features and a distributed communication network.

12. The method of claim 11, wherein the interactive graphical user interface display includes entity score results and uniform scoring matrices.

13. The method of claim 11, wherein the entity score is based on:
   show me data including the constructed computer system configurations, a technical score, a functional score, and a sandbox review score; and
   tell me data including data provided in response to questions unassociated with the automatic evaluation of the constructed computer system configuration.

14. The method of claim 11, wherein the automated testing script of the use case parameters is associated with a simulated product that is analogous to an actual product.

15. The method of claim 11, wherein the automated testing script of the use case parameters is configured to expose common platform failure points.

16. The method of claim 11, wherein the constructed computer system configurations are associated with Software as a Service ("SaaS") implementations for various use cases.

17. A non-transitory, computer-readable medium storing instructions, that, when executed by a computer processor, cause the computer processor to perform a method to provide an entity selection tool platform via a back-end application computer server of an enterprise, the method comprising:
   providing a use case configuration data store containing electronic records that represent a plurality of potential relationships between the enterprise and at least one entity, wherein each electronic record of the use case configuration data store includes an electronic record identifier, use case parameters defining test situations adapted for implementation by the at least one entity, and an entity score result of the at least one entity;

providing a quality function deployment data store containing electronic records that represent the plurality of potential relationships, wherein each electronic record of the quality function deployment data store includes an electronic record identifier and a uniform scoring matrix;

arranging, by the backend application computer server, for a first entity associated with a remote user device to construct a plurality of computer system configurations, on-site at the enterprise, in accordance with an automated testing script of the use case parameters;

automatically evaluating, by the backend application computer server, the constructed computer system configurations and storing an entity score result for the first entity into a use case configuration data store;

retrieving, by the backend application computer server from the quality function deployment data store, an electronic record associated with the first entity;

updating, by the backend application computer server, a uniform scoring matrix included in the retrieved electronic record by assigning weighted score values for the first entity in connection with a set of platform capabilities of the enterprise;

executing, by the backend application computer server, the entity selection tool to automatically select a recommended entity based at least on the entity score result and the updated uniform scoring matrix of the first entity; and transmitting, by the backend application computer server, an indication of the recommended entity to an interactive graphical user interface display of the remote user device via security features and a distributed communication network.

18. The medium of claim 17, wherein the interactive graphical user interface display includes entity score results and uniform scoring matrixes.

19. The medium of claim 17, wherein the entity score is based on:
   show me data including the constructed computer system configurations, a technical score, a functional score, and a sandbox review score; and
   tell me data including data provided in response to questions unassociated with the automatic evaluation of the constructed computer system configuration.

20. The medium of claim 17, wherein the automated testing script of the use case parameters is associated with a simulated product that is analogous to an actual product.

* * * * *